United States Patent
Park (10) Patent No.: US 7,274,359 B2
(45) Date of Patent: Sep. 25, 2007

(54) DISPLAY DEVICE AND CIRCUIT BOARD THEREFOR INCLUDING INTERCONNECTION FOR SIGNAL TRANSMISSION

(75) Inventor: Haeng-Won Park, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 288 days.

(21) Appl. No.: 10/379,902

(22) Filed: Mar. 6, 2003

(65) Prior Publication Data

US 2003/0169246 A1    Sep. 11, 2003

(30) Foreign Application Priority Data

Mar. 6, 2002    (KR) .................. 10-2002-0011885
Mar. 6, 2002    (KR) .................. 10-2002-0011887

(51) Int. Cl.
*G09G 5/00*    (2006.01)
(52) U.S. Cl. .................. 345/204; 345/205; 345/206; 345/87; 345/98
(58) Field of Classification Search ............... 345/204, 345/205, 206, 50, 55, 87, 98
See application file for complete search history.

(56) References Cited

U.S. PATENT DOCUMENTS

| 5,065,148 A | * | 11/1991 | Yee-Kwong | ............... 345/87 |
| 5,634,013 A | * | 5/1997 | Childers et al. | ............ 710/100 |
| 6,750,926 B2 | * | 6/2004 | Ohgiichi et al. | ............ 349/40 |
| 6,948,098 B2 | * | 9/2005 | Pillay et al. | .................. 714/34 |
| 2002/0126082 A1 | * | 9/2002 | Matsuzaki | .................. 345/98 |

* cited by examiner

*Primary Examiner*—Richard Hjerpe
*Assistant Examiner*—Leonid Shapiro
(74) *Attorney, Agent, or Firm*—MacPherson Kwok Chen & Heid LLP (57) ABSTRACT

A display device including a plurality of pixels is provided, which includes: a signal controller for processing image data for the pixels from an external source; a plurality of pad areas, each pad area provided with a plurality of conductors for transmission of the image data, the conductors of adjacent two of the pad areas having a correspondence; and a plurality of interconnections connecting the corresponding conductors, wherein each conductor in each pad area transmits one of bits of the image data and the corresponding conductors are arranged in reversed order on the respective pad areas. The display device further includes a plurality of data driver units connected to the respective pad areas and sequentially activated to receive respective image data from the pad areas under control of the signal controller, the data driver units converting the received image data into analog voltages and provides the analog voltage for the pixels under control of the signal controller.

15 Claims, 7 Drawing Sheets

DISPLAY DEVICE AND CIRCUIT BOARD THEREFOR INCLUDING INTERCONNECTION FOR SIGNAL TRANSMISSION

RELATED APPLICATIONS

This application claims priority of Korean Patent Application Nos. 2002-0011885 and 2002-0011887, both filed Mar. 6, 2002, the respective disclosures of which are incorporated herein by reference.

BACKGROUND OF THE INVENTION (a) Field of the Invention

The present invention relates to a display device and a circuit board therefor, and in particular, to a liquid crystal display and a circuit board including a plurality of interconnections for signal transmission.

(b) Description of Related Art

Flat panel displays such as liquid crystal displays (LCDs) have been developed and substituted for cathode ray tubes (CRTs) since they are suitable for recent personal computers and televisions, which become lighter and thinner.

An LCD representing the flat panel displays includes a liquid crystal panel assembly including two panels provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes. A typical LCD includes thin film transistors (TFTs) as switching elements for controlling the voltages to be applied to the pixel electrodes, and a plurality of display signal lines for transmitting signals to be applied to the TFTs.

In addition, the LCD further includes a printed circuit board (PCB) provided with a plurality of circuit elements. In particular, a signal controller for processing image signals from an external source and generating control signals for controlling the image signals and a voltage generator for generating a plurality of source voltages used for generating various signals are mounted on the PCB in forms of integrated circuit (IC) chips.

The liquid crystal panel assembly and the PCB are connected via a plurality of tape carrier packages (TCPs) arranged in series. The TCPs are provided with a plurality of data driver ICs for converting the image signals into the analog voltages to be applied to the pixel electrodes under the control of the signal generator.

For electrical connection between the circuit elements on the PCB and the data driver ICs, a plurality of pad areas including a plurality of parallel conducting lines and a plurality of parallel interconnections connecting the conducting lines on the adjacent pad areas are provided on the PCB, and a plurality of conductive lines to be connected to the conducting lines of the PCB are provided on the TCPs.

In a typical LCD, the image signals from the signal controller are sequentially transmitted to the data driver ICs through the interconnections between the signal generator and one of the pad areas and then through the interconnections between the pad areas. For example, when first to tenth TCPs mounting the data driver ICs and corresponding pad areas are provided, the image signals from the signal controller required for the second data driver ICs pass through the interconnections between the first pad area and the second pad area and reach the second TCP, those required for the third data driver ICs pass through the interconnections between the second pad area and the third pad area as well as the interconnections between the first pad area and the second pad area, and so on.

In this case, there is a problem that the interconnections on the PCB are very long and curved many times and thus cause electromagnetic interference (EMI) and complexity of the wires of the PCB, which is especially severe for high resolution and large-sized LCDs. For example, the interconnections between the pad areas have four turning points since both the pad areas and the conducting lines on the pad areas are arranged in the same direction and thus the parallel interconnections are connected between an upper edge of one pad area and a lower edge of the adjacent pad area for preventing intersections of the interconnections. That is, the interconnections start upwards from the conducting lines of one pad area, turn right toward the other pad area, turn down between the pad areas, turn right toward the other pad area, and finally go upwards to the corresponding conducting lines of the other pad area.

SUMMARY OF THE INVENTION

According to an aspect of the present invention, a circuit board for a display device is provided, which includes: a plurality of pad areas, each pad area provided with a plurality of conductors for transmitting image data to outside, the conductors of adjacent two of the pad areas having a correspondence; and a plurality of interconnections connecting the corresponding conductors, wherein the corresponding conductors are arranged in reversed order on the respective pad areas.

It is preferable that the circuit board includes a signal controller for processing the image data from an external source to be suitable for the display and providing the processed image data for at least one of the pad areas.

The corresponding conductors of the adjacent two pad areas may have inversion symmetry with respect to a line located between the adjacent two pad areas.

The pad areas may be arranged in a first direction and the conductors in each pad area are arranged in the first direction and include first to third pad areas arranged in sequence. The interconnections may include first and second interconnections connected between the first and the second pad areas and between the second and the third pad areas, respectively, and the first and the second interconnections are preferably placed opposite each other with respect to a line connecting the first to the third pad areas.

Preferably, the interconnections include substantially the same layer.

It is preferable that the signal controller sequentially provides the image data and the processing of the signal controller includes swapping of bits of a first set of the image data.

The swapping includes reversal of order of the bits of each image data in the first set of the image data.

The number of the conductors on each pad area is preferably equal to a bit number of each image data. Each image data may include red, green and blue data with respective bits and each of the red, the green and the blue data may include an odd data and an even data. The signal controller may be connected to only one of the pad areas.

According to another aspect of the present invention, a display device including a plurality of pixels is provided, which includes: a signal controller for processing image data for the pixels from an external source; a plurality of pad areas, each pad area provided with a plurality of conductors for transmission of the image data, the conductors of adjacent two of the pad areas having a correspondence; and a plurality of interconnections connecting the corresponding conductors, wherein each conductor in each pad area transmits one of bits of the image data and the corresponding conductors are arranged in reversed order on the respective pad areas.

It is preferable that the display device further includes a plurality of data driver units connected to the respective pad areas and sequentially activated to receive respective image data from the pad areas under control of the signal controller, the data driver units converting the received image data into analog voltages and provides the analog voltage for the pixels under control of the signal controller.

Preferably, the signal controller sequentially outputs the image data.

According to an embodiment of the present invention, the processing of the signal controller includes swapping of bits of a set of the image data to be provided for one of the data driver units. The swapping includes reversal of order of the bits of each image data in the first set of the image data.

Each image data may include red, green and blue data with respective bits and each of the red, the green and the blue data may include an odd data and an even data and the data driver units have a dual port structure.

The signal controller may provide the image data for only one of the pad areas.

According to another embodiment of the present invention, each of the data driver units comprises a swapping terminal for swapping bits of the image data.

Preferably, each of the data driver units further includes a data terminal for transmitting the image data as it is and a multiplexer for selecting one of outputs of the data terminal and the swapping terminal in response to a selection signal. The pad areas are selectively provided with a first terminal providing a first signal and a second terminal providing a second signal and provide the selection signal to the respective data driver units through the first or the second terminal. The first and the second signals are ground and supply voltage, respectively.

According to an embodiment of the present invention, the display device further includes a display panel provided with the pixels; a plurality of tape carrier packages provided with the data driver units; and a printed circuit board provided with the signal controller, the pad areas and the interconnections.

A display device including a plurality of pixels is provided, which includes: a signal controller for processing image data for the pixels from an external source and generating a plurality of control signals for controlling the image data; a plurality of data driver units sequentially activated to receive respective image data in response to one of the control signals, the data driver units converting the received image data into analog voltages and provides the analog voltage for the pixels in response to the control signals; and a plurality of pad areas, each pad area connected to corresponding one of the data driver units and provided with a plurality of conductors for transmitting the image data and the control signals to the one of the data driver unit, wherein each of the data driver units includes a data terminal for transmitting the image data as it is, a swap terminal for swapping the image data having a plurality of bits arranged in reversed order, and a multiplexer for selecting one of the data terminal and the swap terminal in response to a selection signal.

Preferably, the pad areas are selectively provided with a first terminal providing a first signal and a second terminal providing a second signal and provide the first signal or the second signal as the selection signal to the respective data driver units. The exemplary first and second signals are ground and supply voltages.

Each of the data drivers may have a dual port structure.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

The present invention now will be described more fully hereinafter with reference to the accompanying drawings, in which preferred embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs and PCBs therefor according to embodiments of this invention will be described in detail with reference to the accompanying drawings.

Figure 1:
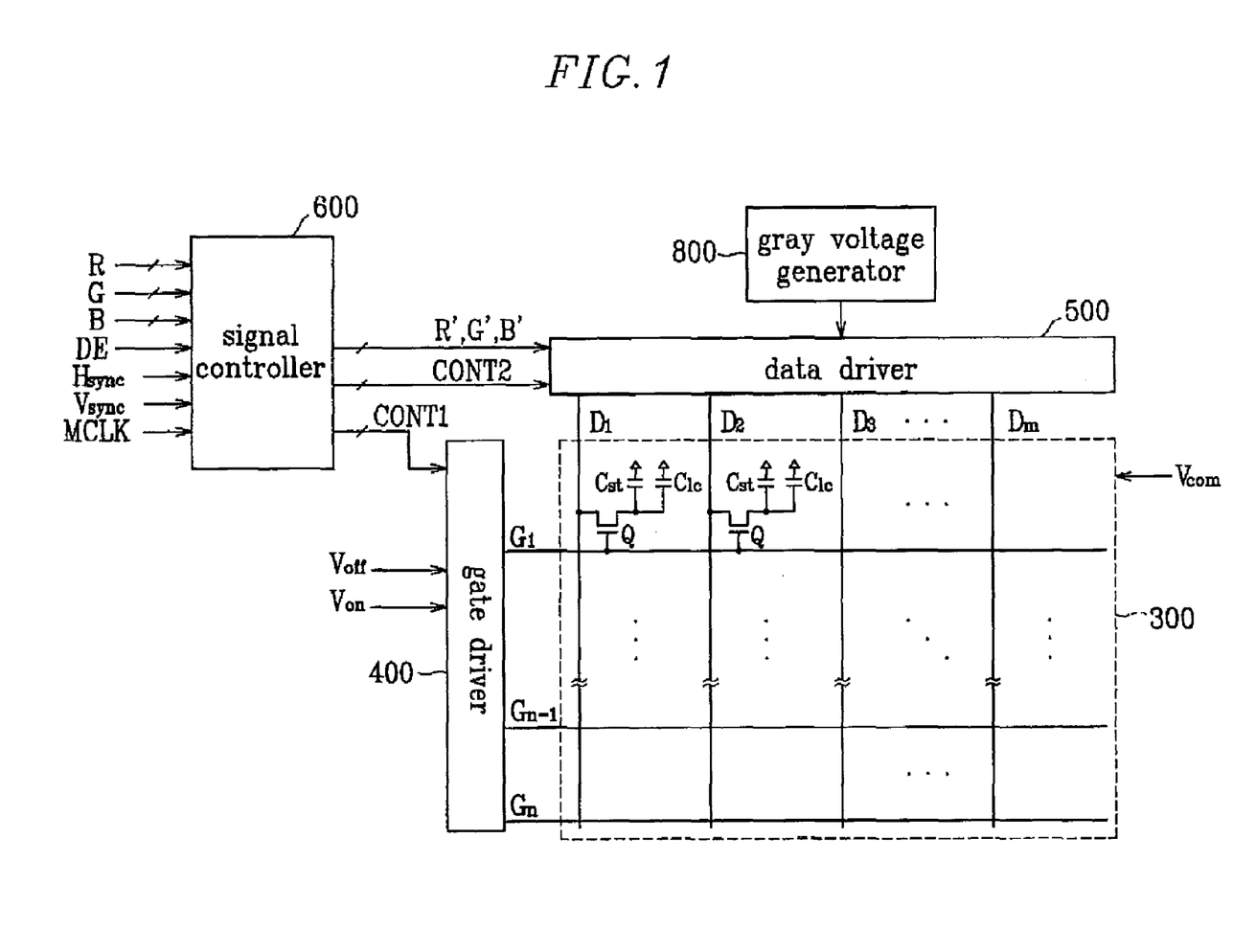
FIG. 1 is a block diagram of an LCD according to an embodiment of the present invention.
Figure 2:
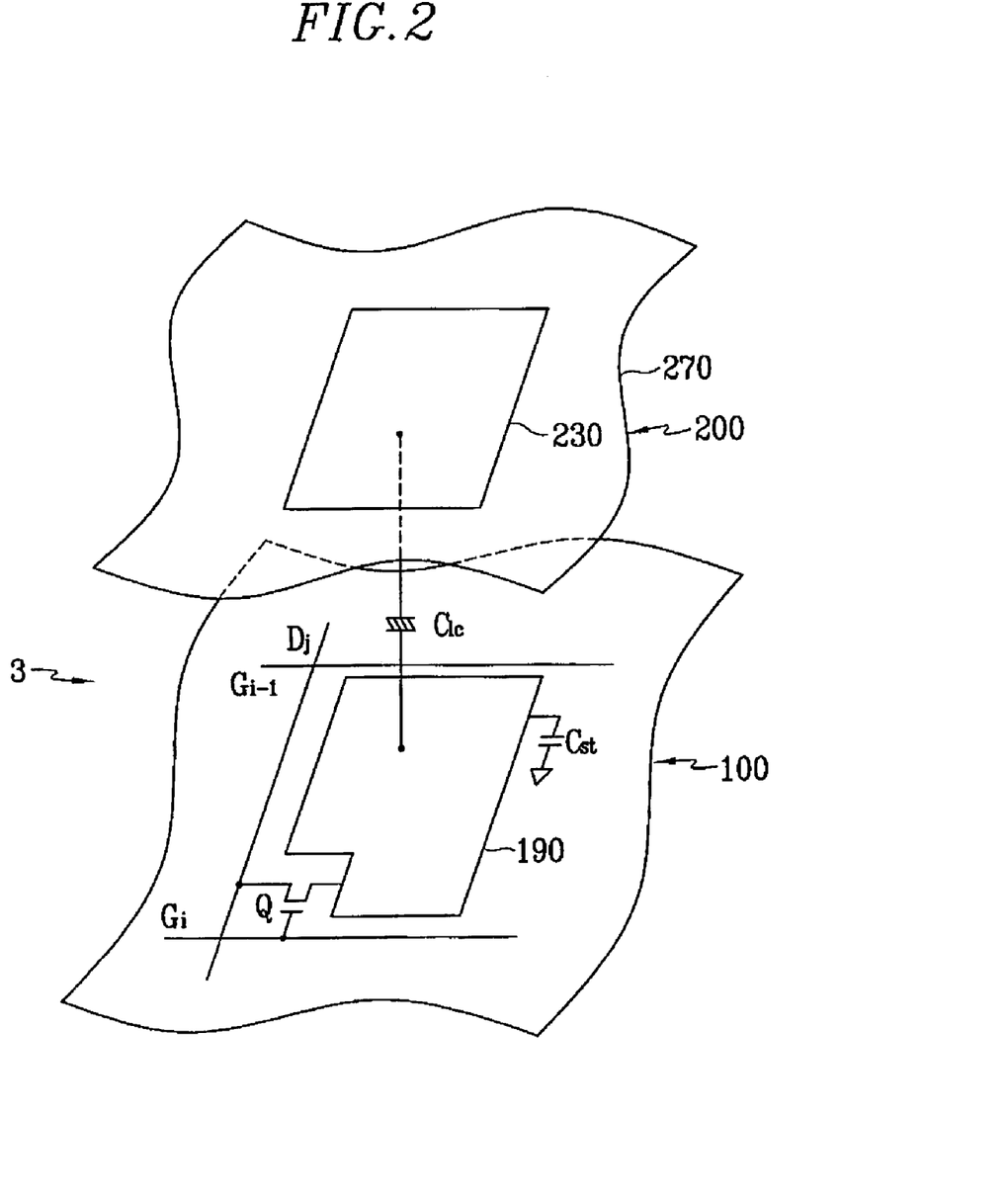
FIG. 2 is an equivalent circuit diagram of a pixel of an LCD according to an embodiment of the present invention.
Figure 3:
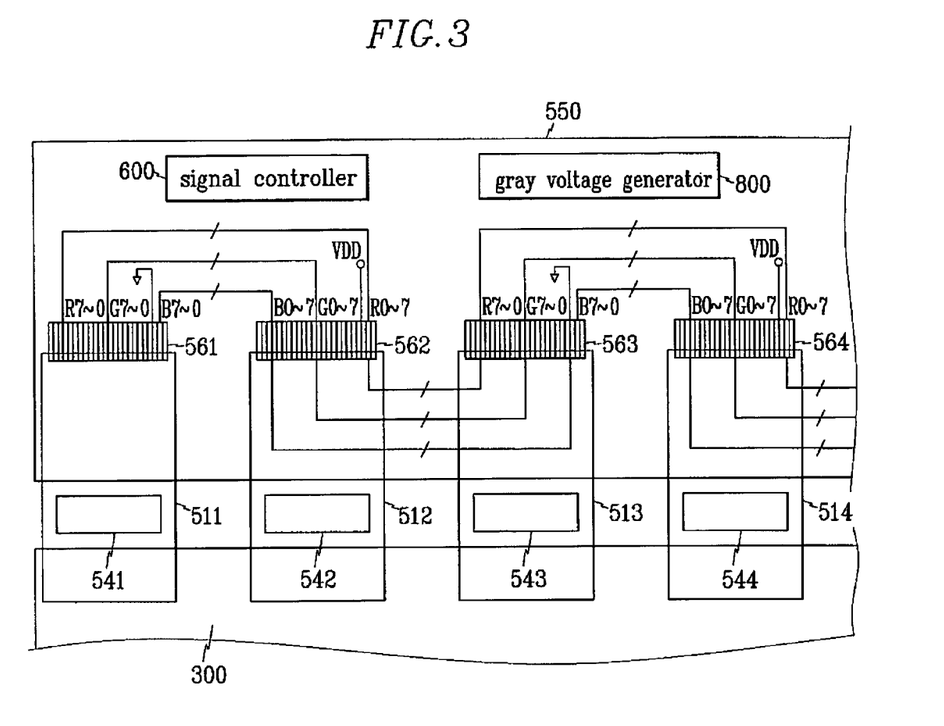
FIG. 3 shows a PCB provided and a liquid crystal panel assembly along with TCPs attached therebetween according to an embodiment of the present invention.

FIG. 1 is a block diagram of an LCD according to an embodiment of the present invention, FIG. 2 is an equivalent circuit diagram of a pixel of an LCD according to an embodiment of the present invention, and FIG. 3 shows schematic structural diagram of an LCD according to an embodiment of the present invention.

Referring to FIG. 1, an LCD according to an embodiment of the present invention includes a liquid crystal panel assembly 300, a gate driver 400 and a data driver 500 which are connected to the panel assembly 300, a gray voltage generator 800 connected to the data driver 500, and a signal controller 600 controlling the above units.

Referring to FIG. 3, the LCD includes a PCB 550 provided with the signal controller 600 and the gray signal generator 800, and a plurality of TCPs 511-514 provided with a plurality of data driver ICs 541-544 forming the data driver 500. A plurality of pad areas 561-564 for signal communication between the signal generator 600 and the ICs 541-544, and a plurality of sets of interconnections between the pad areas 561-564 are also provided on the PCB 550. The detailed structures of the PCB 550 and the TCPs 511-514 will be described later in detail.

The LCD may further include a plurality of gate driver ICs (not shown) forming the gate driver 400, which are mounted on the panel assembly 300 or on other TCPs (not shown) attached to the panel assembly 300. Alternatively, the gate driver 400 is incorporated into the panel assembly 300.

According to another embodiment of the present invention, the data driver ICs 541-544 are mounted on the panel assembly 300 or incorporated into the panel assembly 300.

The panel assembly 300, in circuital view, includes a plurality of display signal lines $G_1$-$G_n$ and $D_1$-$D_m$ and a plurality of pixels connected thereto and arranged substantially in a matrix as shown in FIG. 1. In structural view, the liquid crystal panel assembly 300 includes a lower panel 100, an upper panel 200 and a liquid crystal layer 3 interposed therebetween as shown in FIG. 2.

The display signal lines $G_1$-$G_n$ and $D_1$-$D_m$ are provided on the lower panel 100 and include a plurality of data lines $D_1$-$D_m$ transmitting data signals and a plurality of gate lines $G_1$-$G_n$ transmitting gate signals (or scanning signals). The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element Q connected to the display signal lines $G_1$-$G_n$ and $D_1$-$D_m$, a liquid crystal capacitor $C_{lc}$ and a storage electrode $C_{st}$, which are connected to the switching element Q. The storage electrode $C_{st}$ may be omitted if unnecessary.

The switching element Q such as TFT is provided on the lower panel 100 and has three terminals, a control terminal connected to one of the gate lines $G_1$-$G_n$, an input terminal connected to one of the data lines $D_1$-$D_m$, and an output terminal connected to both the liquid crystal capacitor $C_{lc}$ and the storage capacitor $C_{st}$.

The liquid crystal capacitor $C_{lc}$ includes a pixel electrode 190 on the lower panel 100, a common electrode 270 on the upper panel 200, and the liquid crystal layer 3 as a dielectric between the electrodes 190 and 270. In addition, there are alignment layers (not shown) on the pixel electrode 190 and the common electrode 270. The alignment layers also function as a dielectric between the electrodes 190 and 270, and there may exist impurity ions adsorbed to the surface of the alignment layers, which may cause an additional voltage difference to the voltage difference between the pixel electrode 190 and the common electrode 270. The pixel electrode 190 is connected to the switching element Q, and the common electrode 270 covers the entire surface of the upper panel 100 and is supplied with a common voltage $V_{com}$. Alternatively, both the pixel electrode 190 and the common electrode 270, which have shapes of bars or stripes, are provided on the lower panel 100.

The storage capacitor $C_{st}$, an auxiliary capacitor for the liquid crystal capacitor $C_{lc}$, includes the pixel electrode 190 and a separate signal line (not shown), which is provided on the lower panel 100, overlaps the pixel electrode 190 via an insulator, and is supplied with a predetermined voltage such as the common voltage $V_{com}$. Alternatively, the storage capacitor $C_{st}$ includes the pixel electrode 190 and an adjacent gate line called a previous gate line, which overlaps the pixel electrode 190 via an insulator.

For color display, each pixel represents its own color by providing red, green or blue color filter 230 on an area occupied by the pixel electrode 190. Referring to FIG. 2, the color filter 230 is located in the corresponding area of the upper panel 200, but it may be provided on or under the pixel electrode 190 on the lower panel 100.

Referring to FIG. 1 again, the gray voltage generator 800 generates two sets of a plurality of gray voltages related to the transmittance of the pixels. One of the two sets has a positive value with respect to the common voltage $V_{com}$, while the other has a negative value with respect to the common voltage $V_{com}$.

The gate driver 400 is connected to the gate lines $G_1$-$G_n$ of the panel assembly 300 and applies the gate signals from an external source to the gate lines $G_1$-$G_n$, each gate signal being a combination of a gate-on voltage $V_{on}$ and a gate-off voltage $V_{off}$. The data driver 500 is connected to the data lines $D_1$-$D_n$ of the panel assembly 300, selects some of the gray voltages from the gray voltage generator 800, and applies the selected gray voltages (i.e., the data voltages) to the data lines $D_1$-$D_n$.

When the data voltage is applied to the pixel electrode 190 of the liquid crystal capacitor $C_{lc}$ via the switching element Q, and the voltage difference between the data voltage and the common voltage $V_{com}$ charges the liquid crystal capacitor $C_{lc}$ to have a pixel voltage, i.e., the charged voltage across the liquid crystal capacitor $C_{lc}$.

The orientations of liquid crystal molecules in the liquid crystal capacitor $C_{lc}$ are changed by the change of the pixel voltage, which in turn changes the polarization of light passing through the liquid crystal layer 3. The change of the light polarization results in the variation of the transmittance of the light by a polarizer or polarizers (not shown) attached to at least one of the panels 100 and 200.

In the meantime, the gate driver 400 and the data driver 500 operate under the control of the signal controller 600 connected thereto. The operation will be described in detail.

The signal controller 600 is supplied from an external graphic controller (not shown) with image signals R, G and B and input control signals for controlling the image signals R, G and B. Exemplary input control signals are a vertical synchronization signal $V_{sync}$ for distinguishing frames, a horizontal synchronization signal $H_{sync}$ for distinguishing data rows, a main clock CLK basically required for signal processing, a data enable signal DE for distinguishing valid image signals, etc. After generating a plurality of gate control signals CONT1 and a plurality of data control signals CONT2 on the basis of the input control signals and processing the image signals R, G and B to be suitable for the liquid crystal panel assembly 300, the signal controller 600 provides the gate control signals CONT1 for the gate driver 400, and the processed image data R', G' and B' and the data control signals CONT2 for the data driver 430.

The gate control signals CONT1 include a vertical synchronization start signal STV for instructing to begin outputting gate-on pulses (i.e., gate-on voltage ($V_{on}$) sections of the gate signals), a gate clock signal CPV for controlling the output time of the gate-on pulses and an output enable signal OE for defining the widths of the gate-on pulses.

The data control signals CONT2 include a horizontal synchronization start signal STH for informing the beginning of output of the image data R', G' and B', a load signal LOAD for instructing to apply the data voltages to the data lines, an inversion signal RVS for inverting polarity of the data voltages with respect to the common voltage $V_{com}$ (simply referred to as "the polarity of the data voltages" hereinafter), a data clock signal HCLK basically required for processing the image data, and so on.

Responsive to the data control signals CONT2 from the signal controller 600, the data driver 500 sequentially receives the image data R', G' and B' for a row of the pixels and converts the image data R', G' and B' into analog data voltages selected among the gray voltages from the gray voltage generator 800 corresponding to the image data R', G' and B'.

The gate driver 400 sequentially applies the gate-on voltages $V_{on}$ to the gate lines $G_1$-$G_n$, thereby sequentially turning on the switching elements Q connected thereto in responsive to the gate control signals CONT1 from the signals controller 600, During one horizontal period (referred to as "1H"), which is a turning on period of a row of the switching elements Q connected to one gate line supplied with the gate-on voltage $V_{on}$ and is substantially equal to one period of the horizontal synchronization signal $H_{sync}$, the data enable signal DE and the gate clock signal CPV, the data driver 500 supplies the data voltages to the data lines $D_1$-$D_m$, which in turn are applied to the pixels via the turned-on switching elements Q.

By repeating this procedure, all the gate lines $G_1$-$G_n$ are supplied with the gate-on voltage $V_{on}$ during one frame, and thus the data voltages are applied to all the pixels. Once a frame is finished and the next frame starts, the inversion signal RVS from the signal controller 600 to the data driver 500 is controlled such that the polarity of a data voltage applied to a pixel is opposite to that in the previous frame (referred to as "frame inversion"). During one frame, the polarity of the data voltages via a data line may be different (referred to as "line inversion") and/or the polarity of the data voltages applied to the pixels in a row may be different (referred to as "dot inversion").

Now, detailed structures of a PCB and TCPs of an LCD according to an embodiment of the present invention are described in detail with reference to FIG. 3.

FIG. 3 shows first to fourth data driving ICs 541-544, first to fourth TCPs 511-514 and first to fourth pad areas 561-564 arranged in the row direction, respectively. The number and the type of the data driving ICs 541-544 are determined by the design conditions, and the number of the pad areas 561-564 is the same as that of the ICs 541-544. For an LCD having a resolution of SXGA (1280×1024), if a data driving IC has 384 channels (128×3), the number of the ICs 541-544 and the pad areas 561-564 is ten.

Each pad area 561-564 is provided with a plurality of conducting lines for transmitting image data to the driving ICs 541-544 as shown in FIG. 3. The conducting lines of the adjacent pad areas 561-564 are connected via a plurality of interconnections provided on the PCB 550. Each conducting line carries one bit of the image data, and thus the number of the conducting lines on each pad area 561-564 is the same as the total number of bits of the red, green and blue image data. Accordingly, for an LCD using 8-bit image data, the number of the conducting lines is at least 24 (=8×3). Other conducting lines (not shown) for transmitting other signals such as the data control signals CONT2 are also provided on each pad area 561-564, and other interconnections (not shown) connecting such conducting lines are also provided on the PCB 550.

The PCB 550 preferably has a multi-layered wire structure, and the interconnections between the signal controller 600 and the first pad area 561 and those between the pad areas 561-564 are preferably made of different layers.

A plurality of conductive lines (not shown) connected between input terminals of the data driver ICs 541-544 and the conducting lines on the pad areas 561-564 and a plurality of conductive lines (not shown) connected between output terminals of the data driver ICs 541-544 and the data lines $D_1$-$D_m$ of the panel assembly 300. The conducting lines of each pad area 561-564 have one-to-one correspondence with the input terminals of the corresponding driver IC 541-544, and thus the conducting lines of each pad area 561-564 is defined by the input terminals of the corresponding driver IC 541-544 connected thereto. Since each input terminal of each data driver IC 541-544 receives a predetermined signal such as a predetermined bit of an image data for a predetermined color, each conducting line of each pad area 561-564 can be defined by the predetermined bit of the predetermined color. FIG. 3 shows the conducting lines of the pad areas 561-564 indicated by the predetermined bits and colors such as R0-7, R7-0, G0-7, G7-0, B0-7 and B7-0.

According to an embodiment of the present invention shown in FIG. 3, the conducting lines R7-0, G7-0 and B7-0; and R0-7, G0-7 and B0-7 of the odd pad areas 561 and 563 and the even pad areas 562 and 564 are arranged in a reversed manner. That is, the conducting lines R7-0, G7-0 and B7-0 of the odd pad areas 561 and 563 are arranged in a normal order, i.e., R7, R6, . . . , R1, R0, G7, G6, . . . , G1, G0, B7, B6, . . . , B1 and B0, while the conducting lines B0-7, G0-7 and R0-7 of the even pad areas 562 and 564 are arranged in a reversed order, i.e., B0, B1, . . . , B6, B7, G0, G1, . . . , G6, G7, B0, B1, . . . , B6 and B7. The corresponding conducting lines of the adjacent pad areas 561-564 are connected to each other via the interconnections. In addition, the interconnections between the pad areas 561-564 are located at one of an upper side and a lower side of the pad areas 561-564 and the interconnections between the adjacent pad areas 561-564 are arranged alternately. That is, all the interconnections between the first and the second pad areas 561 and 562 are located at the upper side of the pad areas 561-564, all the interconnections between the second and the third pad areas 562 and 563 are located at the lower side of the pad areas 561-564, and so on. Accordingly, each interconnection is short and less curved, for example, each interconnection shown in FIG. 3 has only two turning points.

Figure 4:
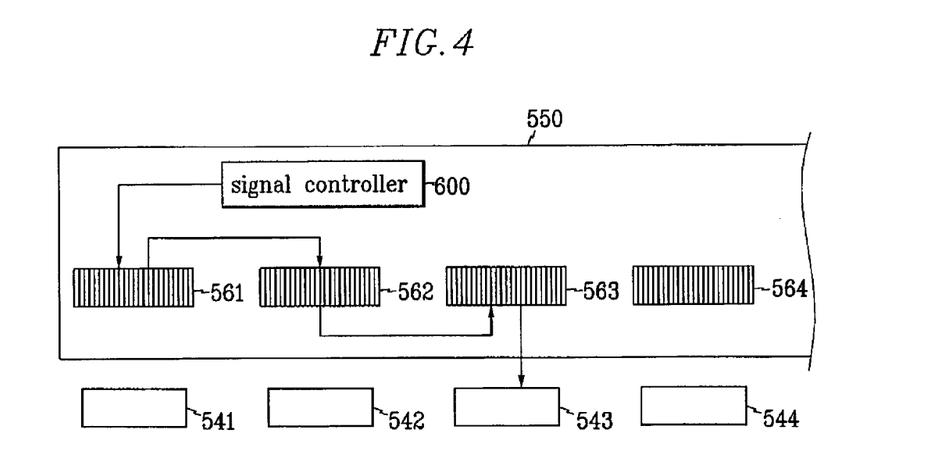
FIG. 4 shows an exemplary path of image signals from a signal controller to a data driver IC.

The transmission of image data from a signal controller to data driver ICs of an LCD shown in FIG. 3 is described with reference to FIG. 4, which shows an exemplary path of image signals from a signal controller 600 to a data driver IC 543.

The signal controller 600 activates the data driver ICs 541-544 in sequence and transmits image data to the activated data driver IC 541-544. For example, after activating the first data driver IC 541, the signal controller 600 transmits a first set of the image data among the image data for a pixel row to the first driver IC 541 through the first pad area 561. Upon the completion of the data transmission to the first driver IC 541, the signal controller 600 then activates the second driver IC 542 and transmits a second set of the image data through the first and the second pad areas 561 and 562. Similarly, the data transmission for the third and the fourth data driving ICs 543 and 544 is performed.

As described above, the conducting lines of the even pad areas 562 and 564 are arranged in a reversed order and thus the image data of the even ICs 542 and 544 are also input in a reversed order. Since the entire data driver ICs 541-544 have the same internal configuration, the reversed input image data of the data driver ICs 541-544 are processed to recover their correct arrangement.

Figure 5:
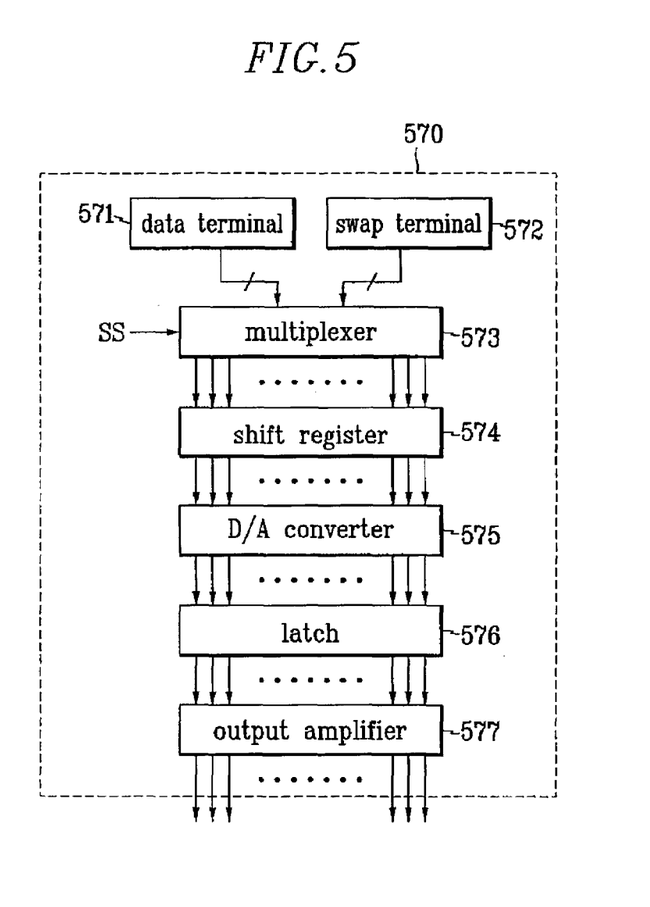
FIG. 5 is a block diagram of a data driver IC according to an embodiment of the present invention.

FIG. 5 is a block diagram of an exemplary data driver IC according to an embodiment of the present invention, which has a mechanism for recovering a reversed input data.

As shown in FIG. 5, a data driver IC 570 according to an embodiment of the present invention includes a data terminal 571, a swap terminal 572, a multiplexer 573 for selection of the two terminals 571 and 572, a shift register 574 connected to the multiplexer 573, a D/A converter 575 connected to the shift register 574, a latch 576 connected to the D/A converter 575, and an output amplifier 577 connected to the latch 576 and the data lines $D_1$-$D_m$ of the panel assembly 300.

The swap terminal 572 transmits an input data after reversing the bit order of the input data, while the data terminal 571 transmits the input data as it is.

The multiplexer 573 selects signals from either of the data terminal 571 and the swap terminal 572 in response to a selection signal SS, which is preset in the pad areas 561-564. Referring to FIG. 3, ground terminals connected to a ground and supply terminals connected to a supply voltage VDD for supplying the selection signal SS are provided on the PCB 550. The ground terminals are assigned to the odd pad areas 561 and 563, while the supply terminals are assigned to the even pad areas 562 and 564. Accordingly, the multiplexers 573 of the odd driving ICs 541 and 543 are supplied with the selection signals from the ground terminals and select the data terminal 571, while the multiplexers 573 of the even driving ICs 542 and 544 are supplied with the selection signals from the supply terminals and select the swap terminal 572. Alternatively, the selection signal SS is provided from the signal controller 600.

The shift register 574 receives and shifts the image data for a pixel row from the multiplexer 573 for every bit, thereby converting serially-inputted data into parallel data. After completion of the parallelization of the image data by the shift register 574, the D/A converter 575 converts the 8-bit image data into analog data voltages, which is selected from the gray voltages. The analog data voltages are temporarily stored in the latch 576, amplified by the output amplifier 577, and applied to the panel assembly 300.

Figure 6:
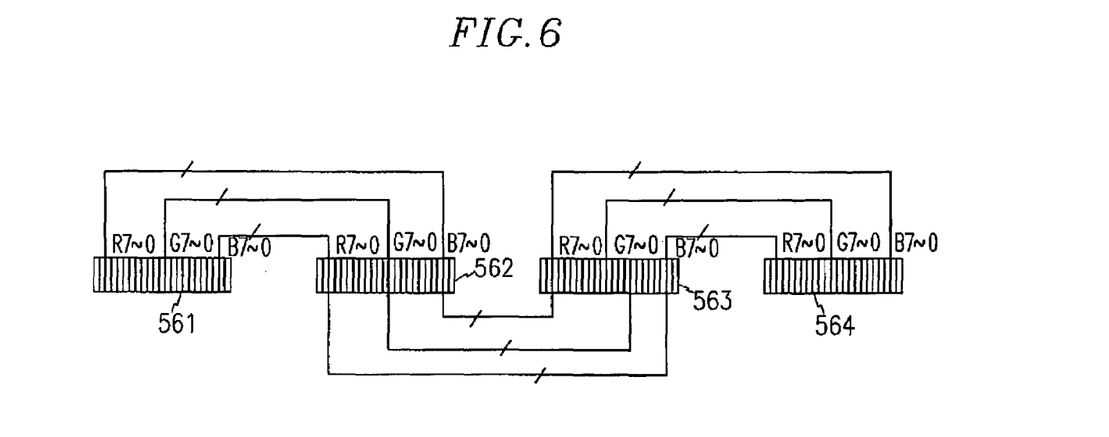
FIG. 6 shows pad areas and interconnections therebetween of an LCD according to another embodiment of the present invention.
Figure 7:
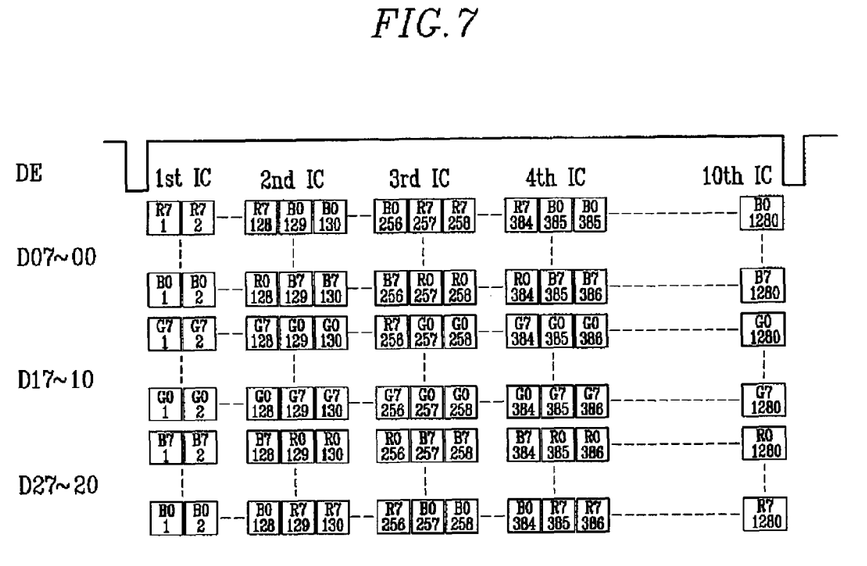
FIG. 7 shows an exemplary format of image data suitable for the LCD shown in FIG. 6.

FIG. 6 shows pad areas and interconnections therebetween of an LCD according to another embodiment of the present invention, and FIG. 7 shows an exemplary format of image data suitable for the LCD shown in FIG. 6.

As shown in FIG. 6, the conducting lines of all the pad areas 561-564 are arranged in the same manner, unlike those shown in FIG. 3. That is, the conducting lines R7-0, G7-0 and B7-0 of each pad area 561-564 are arranged in a normal order, i.e., R7, R6, . . . , R1, R0, G7, G6, . . . , G1, G0, B7, B6, . . . , B1 and B0. Accordingly, the conducting lines indicated by the same numeral of the adjacent data pad areas 561-564 are not connected to each other. For example, pairs of the conducting lines of the first and the second pad areas 561 and 562, which are connected via the interconnections, are (R7, B0), (R6, B1), . . . , (R1, B6), (R0, B7), (G7, G0), (G6, G1), . . . , (G1, G6), (G0, G7), (B7, R0), (B6, R1), . . . , (B1, R6) and (B0, R7), which can be represented by $(Ci,\overline{C}(N-i-1))$, where C and $\overline{C}$ are any one of (R, B), (B, R) and (G, G), N is the bit number of the image data, and i=0, 1, . . . , (N-1).

For correct transmission of image data bits, the signal controller 600 swaps sets of the image data for the even data drivers 542 and 544. Referring to FIG. 7, which shows waveforms of image data and a data enable signal for an LCD with 1280 vertical resolution and ten driver ICs, the 1st to the 128th image data for the first IC is transmitted as it is, the 129th to the 256th image data for the second IC is swapped to be transmitted, the 257th to the 384th image data for the third IC is transmitted as it is, the 385th to the 512th image data for the fourth IC is swapped to be transmitted, and so on. Therefore, a bit Ci of an image data for the second IC passes through the conducting line $\overline{C}(N-i-1)$ of the first pad area, a bit Ci of an image data for the fourth IC passes through the conducting lines $\overline{C}(N-i-1)$ of the first and the third pad areas and the conducting line Ci of the second pad area, and so forth.

Figure 8:
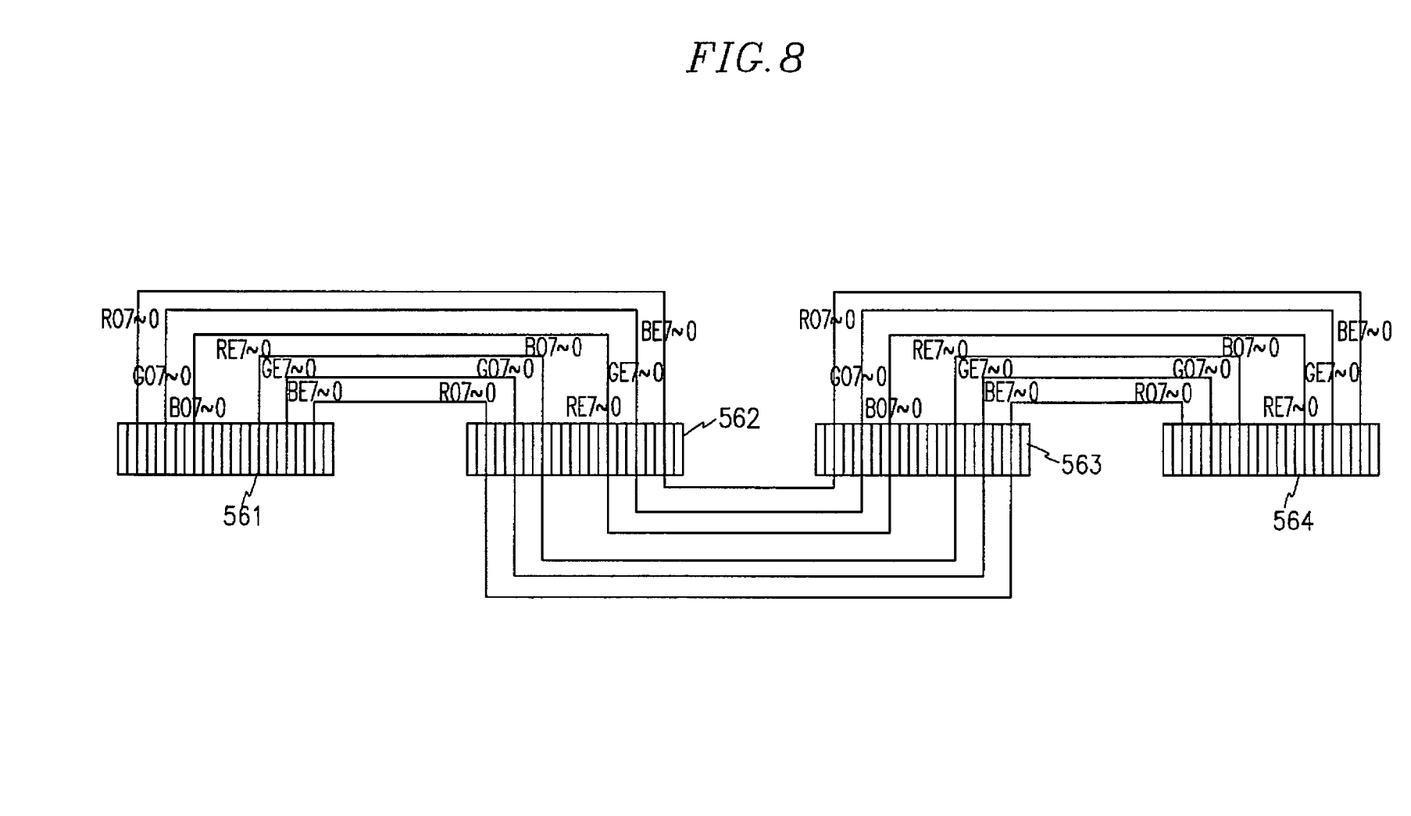
FIG. 8 shows pad areas and interconnections therebetween of an LCD according to another embodiment of the present invention.
Figure 9:
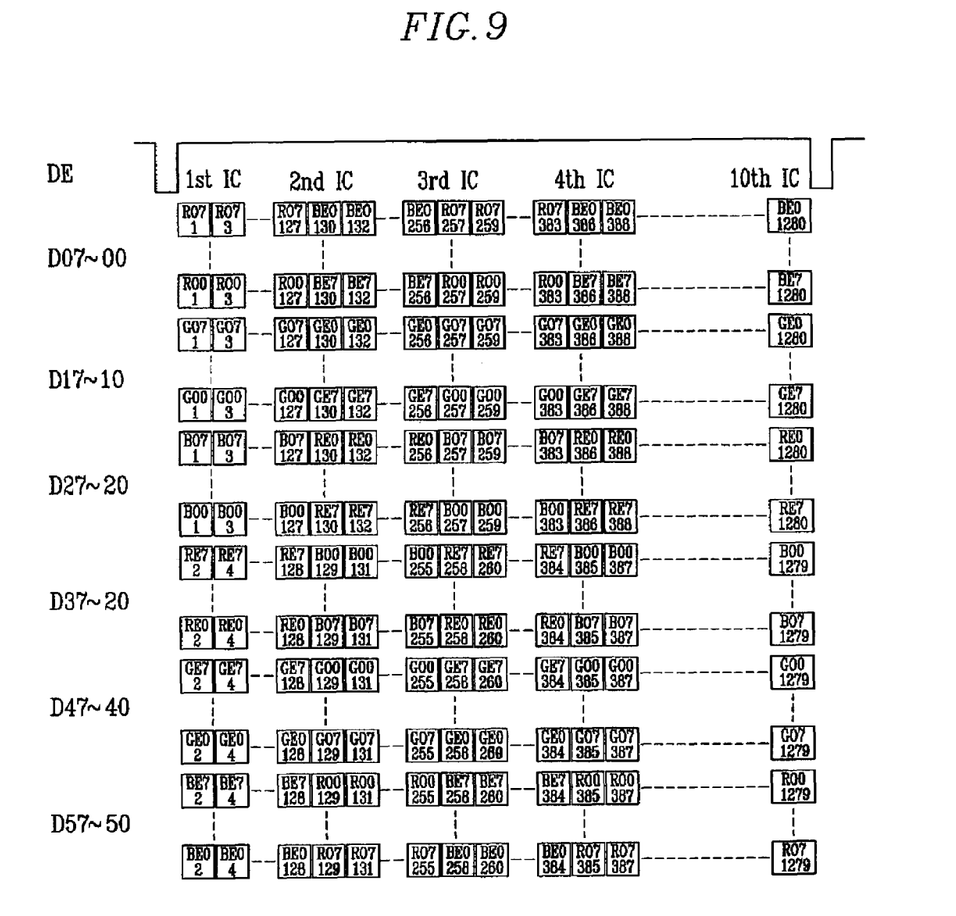
FIG. 9 shows an exemplary format of image data suitable for the LCD shown in FIG. 8.

FIG. 8 shows pad areas and interconnections therebetween of an LCD according to another embodiment of the present invention, and FIG. 9 shows an exemplary format of image data suitable for the LCD shown in FIG. 8.

Pad areas 561-564 and interconnections therebetween shown in FIG. 8 are used for dual port data driving ICs, which have respective sets of output terminals for odd image data and even image data and separately processes and outputs the odd image data and the even image data. As shown in FIG. 8, the arrangement of the conducting lines of each pad area 561-564 is substantially the same, and the conducting lines RO7-0, GO7-0 and BO7-0 for the odd data and the conducting lines RE7-0, GE7-0 and BE7-0 for the even data are sequentially arranged from the left to the right. The interconnections are connected between the conducting lines of two adjacent pad areas 561-564 such that the pairs of the conducting lines connected to each other have an inversion symmetry. That is, the pairs of the conducting lines connected to each other are (RO7, BE0), . . . , (GO7, GE0), . . . , (BO7, RE0), . . . , (RE7, BO0), . . . , (GE7, GO0), . . . , and (BE7, RO0), which can be represented by $(CPi,\overline{CP}(N-i-1))$, where C and $\overline{C}$ is any one of (R, B), (B, R) and (G, G), P and $\overline{P}$ is any one of (O, E) and (E, O), N is the bit number of the image data, and i=0, 1, . . . , (N-1).

Therefore, the interconnections connecting the adjacent pad areas 561-564 do not intersect each other, and thus they can be located in the same layer.

For correct transmission of image data bits, the signal controller 600 swaps sets of both the odd and the even image data for the even data drivers 542 and 544. Referring to FIG. 9, which shows waveforms of image data and a data enable signal for an LCD with 1280 vertical resolution and ten driver ICs, the 1st to the 128th image data for the first IC is transmitted as it is, the 129th to the 256th image data for the second IC is swapped to be transmitted, the 257th to the 384th image data for the third IC is transmitted as it is, the 385th to the 512th image data for the fourth IC is swapped to be transmitted, and so on. Therefore, a bit CPi of an image data for the second IC passes through the conducting line $\overline{CP}$ (N-i-1) of the first pad area, a bit CPi of an image data for the fourth IC passes through the conducting lines $\overline{CP}$ (N-i-1) of the first and the third pad areas and the conducting line Ci of the second pad area, and so forth.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

For example, although the embodiments have been described with reference to LCDs, it is apparent to be utilized for other display devices such as flat panel displays.

What is claimed is:

1. A display device including a plurality of pixels, the display device comprising:
   a signal controller for processing image data for the pixels from an external source;
   a plurality of pad areas, each pad area provided with a plurality of conductors for transmission of the image data, the conductors of adjacent two of the pad areas having a correspondence;
   a plurality of interconnections connecting the corresponding conductors to each other and the conductors of at least one of the pad areas to corresponding outputs of the signal controller, and,
   a plurality of data driver units connected to the respective pad areas and sequentially activated to receive respective image data from the pad areas under control of the signal controller, wherein
   each conductor in each pad area transmits one bit of the image data and the corresponding conductors are arranged in reversed order on the respective pad areas,
   the signal controller sequentially outputs the image data and the processing of the signal controller includes swapping of bits of a set of the image data to be provided for one of the data driver units,
   each of the data driver units comprises a swapping terminal for swapping bits of the image data, a data terminal for transmitting the image data as is, a multiplexer for selecting one of the outputs of the data terminal and the swapping terminal in response to a selection signal, a shift register connected to the multiplexer, a D/A converter connected to the shift register, a latch connected to the D/A converter, and an output amplifier connected to the latch, and
   the swapping terminal and the data terminal receive the image data from the signal controller.

2. The display device of claim 1, further comprising a plurality of data driver units connected to the respective pad areas and sequentially activated to receive respective image data from the pad areas under control of the signal controller, the data driver units converting the received image data into analog voltages and provides the analog voltage for the pixels under control of the signal controller.

3. The display device of claim 1, wherein the swapping includes reversal of order of the bits of each image data in the first set of the image data.

4. The display device of claim 3, wherein each image data includes red, green and blue data with respective bits.

5. The display device of claim 4, wherein each of the red, the green and the blue data includes an odd data and an even data and the data driver units have a dual port structure.

6. The display device of claim 2, wherein the Signal controller provides the image data for only one of the pad areas.

7. The display device of claim 2, further comprising:
   a display panel provided with the pixels;
   a plurality of tape carrier packages provided with the data driver units; and,
   a printed circuit board provided with the signal controller, the pad areas. and the interconnections.

8. A display device including a plurality of pixels, the display device comprising:
   a signal controller for processing image data for the pixels from an external source;
   a plurality of pad areas, each pad area provided with a plurality of conductors for transmission of the image data, the conductors of adjacent two of the pad areas having a correspondence;
   a plurality of interconnections connecting the corresponding conductors; and,
   a plurality of data driver units connected to the respective pad areas and sequentially activated to receive respective image data from the pad areas under control of the signal controller,
   wherein each conductor in each pad area transmits one of the bits of the image data and the corresponding conductors are arranged in reversed order on the respective pad areas,
   the data driver units convert the received image data into analog voltages and provide the analog voltage for the pixels under control of the signal controller,
   each of the data driver units comprises a swapping terminal for swapping bits of the image data, a data terminal for transmitting the image data as is, a multiplexer for selecting one of the outputs of the data terminal and the swapping terminal in response to a selection signal, a shift register connected to the multiplexer, a D/A converter connected to the shift register, a latch connected to the DA converter, and an output amplifier connected to the latch, and
   the swapping terminal and the data terminal receive the image data from the signal controller.

9. The display device of claim 8, further comprising:
   a display panel provided with the pixels;
   a plurality of tape carrier packages provided with the data driver units; and,
   a printed circuit board provided with the signal controller, the pad areas and the interconnections.

10. The display device of claim 8, wherein the pad areas are selectively provided with a first terminal providing a first signal and a second terminal providing a second signal and provide the selection signal to the respective data driver units through the first or the second terminal.

11. The display device of claim 10, wherein the first and the second signals are ground and supply voltage, respectively.

12. A display device including a plurality of pixels, the display device comprising:
    a signal controller for processing image data for the pixels from an external source and generating a plurality of control signals for controlling the image data;
    a plurality of data driver units sequentially activated to receive respective image data in response to one of the control signals, the data driver units converting the received image data into analog voltages and providing the analog voltage for the pixels in response to the control signals; and,
    a plurality of pad areas, each pad area connected to a corresponding one of the data driver units and provided with a plurality of conductors for transmitting the image data and the control signals to the corresponding data driver unit,
    wherein each of the data driver units includes a data terminal for transmitting the image data as is, a swap terminal for swapping the image data having a plurality of bits arranged in reversed order, and a multiplexer for selecting one of the data terminal and the swap terminal in response to a selection signal, a shift register connected to the multiplexer, a D/A converter connected to the shift register, a latch connected to the D/A converter, and an output amplifier connected to the latch, and the swap terminal and the data terminal receive the image data from the signal controller.

13. The display device of claim 12, wherein the pad areas are selectively provided with a first terminal providing a first signal and a second terminal providing a second signal and provide the first signal or the second signal as the selection signal to the respective data driver units.

14. The display device of claim 13, wherein the first and the second signals are ground and supply voltage, respectively.

15. The display device of claim 12, wherein each of the data drivers has a dual port Structure.

* * * * *